June 9, 1964 F. Y. GREPE 3,136,938
BRAKING CIRCUIT FOR A.C. HOIST MOTOR
Filed Nov. 1, 1960
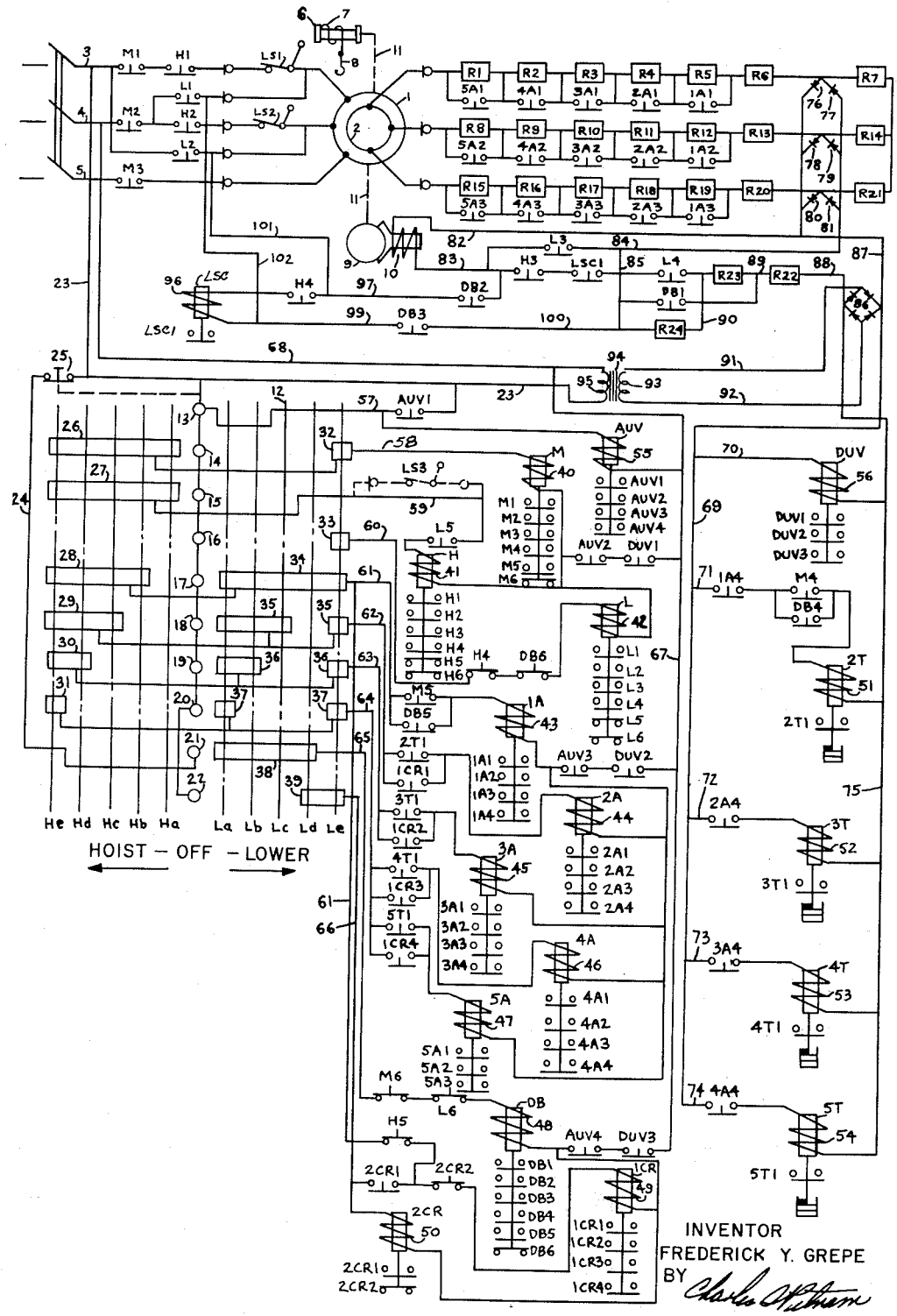
INVENTOR
FREDERICK Y. GREPE
BY
ATTORNEY

United States Patent Office 3,136,938
Patented June 9, 1964

3,136,938
BRAKING CIRCUIT FOR A.C. HOIST MOTOR
Frederick Yorke Grepe, Scarborough, Ontario, Canada, assignor to Canadian Controllers, Limited, Scarborough, Ontario, Canada, a corporation of Canada
Filed Nov. 1, 1960, Ser. No. 66,605
7 Claims. (Cl. 318—209)

This invention relates to a speed control system for alternating current induction motors and more particularly for motor drives for crane hoists and the like.

In the preferred embodiment of my invention the speed of a motor during hoisting is controlled in the normal manner where the resistor in the motor's secondary circuit are shorted out step-by-step by secondary contactors. The operation of the secondary contactors is controlled by the position of a drum controller and the operation of timing contactors.

During the first four points lowering, the motor is disconnected from the supply mains and the load will be lowered because of its own weight. To control the speed of the motor during these lowering points, the stator is connected to be energized by a D.C. current obtained from the motor's secondary. The current in the motor's secondary is dependent upon the speed at which the rotor is rotating due to the overhauling load. Therefore, the larger the load, the faster the rotor will rotate and the more current it will produce to feed to the stator to serve as braking torque. Thus, the load on the hook determines the amount of D.C. current applied to the stator of the motor.

On the fifth point lowering, the motor is connected to the supply mains so it drives the load downward and acceleration automatically takes place by timed control of the secondary contactors.

Further, the embodiment of the invention is adapted so contacts of an overhoist limit switch may be placed in their normal position, that is, in series with the winding of the hoisting contactor; or in the supply mains between the source of power and the motor. When the limit switch contacts are in the latter position, the A.C. hoist scheme has even greater safety features than D.C. hoist schemes.

An electromagnetically operated friction brake is connected to the motor to stop and hold it when desired. Its winding is connected to be energized from the secondary circuit of the motor. Thus, in the hoisting direction it is necessary that the motor be energized before the brake is released.

Further, if the load is hoisted too high and goes through the overhoist limit switch to operate its contacts, the motor is disconnected from the source. This also removes the energization from the brake so it will set to stop and hold the motor. The load is thereby prevented from cycling through the overhoist limit switch. This feature is not readily attainable with D.C. hoist schemes.

During lowering, the friction brake is connected to be energized by the same D.C. current that energizes the stator of the motor to supply the braking torque. Thus, it is impossible to have the friction brake released without having the stator energized with direct current producing a braking torque.

It is therefore the primary object of my invention to provide an A.C. hoist scheme that will accomplish the above.

It is a further object of my invention to provide an A.C. hoist scheme with series connected overhoist limit switch contacts.

It is another object of my invention to provide an A.C. hoist scheme that provides compensated braking in the lowering direction.

It is a still further object of my invention to provide an A.C. hoist scheme having the friction brake energize from the secondary current of the motor.

It is still another object of my invention to provide an A.C. hoist scheme where the friction brake will set to prevent cycling of the load through the overhoist limit switch.

Still another object of my invention is to provide an A.C. hoist scheme where in hoisting the friction brake cannot be released until the motor is energized.

A still further object of my invention is to provide an A.C. hoist scheme where in lowering the friction brake cannot be released until the stator of the motor is energized with a D.C. current.

Still other objects of my invention will become apparent to those skilled in the art when the single figured drawing is taken in consideration with the following specification.

Referring to the drawing, there is an alternating current motor having a three phase stator 1 and a wound rotor 2 with a three phase external secondary circuit having in respective phases; resistance sections R1 to R7, R8 to R14, and R15 to R21.

Stator 1 is connected to alternating current supply mains 3, 4 and 5 in which, respectively, are normally open contacts M1, M2 and M3 of a magnetic contactor M to be referred to. In supply mains 3 and 4 are, respectively, normally open contacts H1 and H2 of a magnetic contactor H also to be referred to. When both contactors are operated their contacts are closed to energize stator 1 and drive rotor 2 in the hoisting direction. Likewise, stator 1 may be connected to the supply mains through the normally open contacts L1 and L2 of a magnetic contactor L and the aforementioned contacts of contactor M. When contactors M and L are operated their contacts are closed to energize stator 1 and drive rotor 2 in the lowering direction.

In series with contacts H1 and H2, respectively, are the normally closed contacts LS1 and LS2 of an overhoist limit switch. When contacts LS1 and LS2 open they disconnect stator 1 from the supply mains if it is energized through contacts H1 and H2, but not if it is energized through contacts L1 and L2. The contacts of the overhoist limit switch are operated to become open when the operator lifts the load to high as is well known for switches of this type.

Rotor 2 is connected to a hoist drum 6 and a cable 7 is wound thereon having at one end a load hook 8.

Rotor 2 is also connected to a drum 9 of a normally set friction brake B of known construction having an electromagnetic winding 10 for releasing friction brake B when energized.

These connections of rotor 2 are diagrammatically represented by the dotted line 11.

At 12 generally is a drum type controller which, in the diagrammatic illustration thereof, comprises movable contacts 13 to 22 all connected as shown. Contacts 13 to 20 and 22 are connected to supply main 3 by a wire 23. Contact 21 is connected to supply main 3 by a wire 24, a push button 25 and wire 23. The purpose of push button 25 will be described in detail hereinafter.

These contacts, as will be understood by those skilled in the art, are all movable in unison from the illustrated "off" position toward the left to five successive hoisting positions H*a* to H*e*. They are also movable in unison from the "off" position to the right to five successive lowering positions L*a* to L*e*. These positions are indicated by the vertical lines above the legends "Hoist" and "Lower."

On the several hoisting points, movable contacts 14, 15 and 17 to 20 are engageable with stationary bars 26 to 31.

On the several lowering points, movable contacts 14 and 16 to 22 are engageable with stationary bars 32 to 39.

Drum controller 12 on the various hoisting and lowering points operates and restores electromagnetic contactors as follows.

A contactor M having a winding 40 and normally open contacts M1 to M5 and a normally closed contact M6.

A contactor H having a winding 41 and normally open contacts H1 to H4 and normally closed contacts H5 and H6.

A contactor L having a winding 42 and normally open contacts L1 to L4 and normally closed contacts L5 and L6.

A contactor 1A having a winding 43 and normally open contacts 1A1 to 1A4.

A contactor 2A having a winding 44 and normally open contacts 2A1 to 2A4.

A contactor 3A having a winding 45 and normally open contacts 3A1 to 3A4.

A contactor 4A having a winding 46 and normally open contacts 4A1 to 4A4.

A contactor 5A having a winding 47 and normally open contacts 5A1 to 5A3.

A contactor DB having a winding 48 and normally open contacts DB1 to DB5 and a normally closed contact DB6.

A contactor 1CR having a winding 49 and normally open contacts 1CR1 to 1CR4.

A contactor 2CR having a winding 50 and a normally open contact 2CR1 and a normally closed contact 2CR2.

The following timing contactors do not receive their energization directly through the drum controller, but are operated on the various hoisting and lowering points to which the drum controller can be moved by means of contacts of the aforedescribed contactors.

A timing contactor 2T having a winding 51 and a normally open contact 2T1.

A timing contactor 3T having a winding 52 and a normally open contact 3T1.

A timing contactor 4T having a winding 53 and a normally open contact 4T1.

A timing contactor 5T having a winding 54 and a normally open contact 5T1.

Timing contactors 2T, 3T, 4T and 5T are of the well known construction whereby a time delay is provided after the energization of their windings and before the closing of their normally open contacts. When the windings are de-energized the contacts restore immediately to their open condition. The purpose and function of this time delay interval will be described hereinafter.

A contactor AUV having a winding 55 and normally open contact AUV1 to AUV4 is connected to be energized from contact 13 when in the "off" position. Contact 13 is connected to be energized from main 3 and therefore contactor AUV becomes energized as soon as power is received by supply main 3.

Likewise, a contactor DUV having a winding 56 and normally open contacts DUV1 to DUV3 is connected to be energized as soon as supply main 3 is energized and completely independent of the position of drum controller 12.

The contactors are all illustrated in normally deenergized or restored condition. The said contacts of these contactors are shown without connections thereto, but are reproduced elsewhere in the drawings with their connections to thereby avoid complexity in the drawings.

The said windings of the contactors are connected in an across-the-line type of diagram. The windings of the contactors connected to drum controller 12 comprises horizontal cross wires 57 to 66 with their right ends connected to a common wire 67 going by wire 68 to supply main 4. The remaining contactors are connected from a common wire 69 at their left by horizontal cross wires 70 to 74 and with their right ends connected to a common wire 75.

Winding 10 of friction brake B is connected to be energized from a three phase full wave rectifier consisting of individual rectifiers 76 to 81. Winding 10 is connected by a wire 82 to one side of the three phase rectifier. The other side of winding 10 is connected by a wire 83, contact L3 and a wire 84 to the other side of the three phase rectifier. Contacts H3 and LSC1 are connected in series with each other and in parallel with contact L3.

The three phase rectifier is connected to be energized by respective phases of the external secondary circuit between resistors R6 and R7, resistors R13 and R14, and resistors R20 and R21.

Winding 10 is also connected to be energized from a full wave rectifier 86. One side of rectifier 86 is connected by a wire 87 and 82 to winding 10. The other side of rectifier 86 is connected by a wire 88, a resistor 22, a wire 89, a resistor 23, a wire 90, a resistor R24, a wire 85, contact L3 and wire 83 to winding 10. Contact L4 is in parallel with resistor R24 and contact DB1 is in parallel with resistors R24 and R23.

Rectifier 86 receives energization from wires 91 and 92 which are connected to a secondary 93 of a transformer 94. Transformer 94 has a primary 95 which is connected by wire 68 to supply main 4 and by wire 23 to supply main 3.

Wires 69 and 75 are connected to rectifier 86 to be energized therefrom.

A contactor LSC having a winding 96 and normally open contact LSC1 is connected in parallel across contacts H3 and LSC1 by contact DB2, a wire 97, contact H4, a wire 98 to one side of winding 96 and the other side of winding 96 is connected by a wire 99, contact DB3 and a wire 100 to wire 85.

One side of winding 96 of contactor LSC is connected to supply main 4 by wire 98, contact H4 and a wire 101. The other side of winding 96 is connected to supply main 3 by wire 99 and a wire 102. Thus, contactor LSC can be energized from supply mains 3 and 4 only when contactor H is operated.

In the illustrated "off" position of drum controller 12, contact 13 is energized directly from supply main 3 by wire 23. Therefore, contactor AUV is operated by current through contact 13, cross wire 57 and winding 55. Contactor AUV operates to close contacts AUV1 to AUV4. Contact AUV1 in closing connects winding 55 directly to wire 23 so contactor AUV will remain operated independent of the position of drum controller 12.

Likewise, wires 23 and 68 energize transformer 94 so rectifier 86 has an output. Wire 69, cross wire 70 and wire 75 connect winding 56 of contactor DUV so it is energized and operates to close contacts DUV1 to DUV3. Since contactor DUV is not energized through drum controller 12 it also remains energized independent of the position of drum controller 12.

On the first point Ha of hoisting, contactor M is operated by current through contact 14, bar contact 26, cross wire 58, winding 40, contact AUV2 and contact DUV1. When contactor M operates it closes its contacts M1 through M5 and opens its contact M6.

Contactor H is operated by current through contact 15, bar contact 27, cross wire 59, contact L5, winding 41, contact AUV2 and contact DUV1. When contactor H operates it closes contacts H1 through H4 and opens contacts H5 and H6.

If the series connected overhoist limit switch contacts are not used, then an overhoist limit switch contact LS3 is connected in cross wire 59 as is shown dotted.

The closing of contacts M1 to M3 and H1 and H2 gives current to stator 1 of the motor. This occurs only if contactor L is restored to close said contact L5 and if the limit switch contacts LS1 and LS2 are in their normal closed position.

When contacts H1 and H2 close, winding 96 of contactor LSC is energized from mains 3 and 4 by wires 101 and 102 and the now closed contact H4. When contactor LSC operates it closes contact LSC1.

It is seen that contactor LSC could not operate if either of the limit switch contacts LS1 or LS2 were open.

With stator 1 energized and rotor 2 held from rotating due to friction brake B, the external secondary circuit is energized with high current. This current flows from the three phase rectifier through wire 82, winding 10 of friction brake B, wire 83, contactor H3, contact LSC1, wire 85 and wire 86 to the other side of the three phase rectifier. This energization of winding 10 from the secondary circuit of rotor 2 is sufficient to cause the friction brake B to be released and the rotor 2 is allowed to rotate.

It is to be noted that immediately upon the closing of contactor LSC, winding 10 of friction brake B is energized from rectifier 86 by the circuit consisting of wire 87, wire 82, winding 10, wire 83, contact H3, contact LSC1, wire 85, resistor R24, wire 90, resistor R23, wire 89, resistor R22 and wire 88. However, the presence of resistors R22, R23 and R24 in this circuit prevents the current supplied by rectifier 86 from being sufficient to release friction brake B. While this current is not sufficient to release brake B, it is sufficient to maintain brake B released once it has been released by other means.

This feature is necessary because on extremely light loads or empty hooks the secondary current may become so small that it is insufficient to maintain brake B released. When this happens, brake B will set and stop rotor 2, which again will act as a transformer and supply a large surge of current through its external secondary circuit sufficient to release brake B. As soon as the secondary current again drops off to its low value, brake B will set. This continuous setting or chattering of brake B is very dangerous to the crane and is also damaging to the brake and motor. Therefore, the energization of brake B to maintain it released, once released by other means, has been provided to overcome this difficulty.

However, should the friction of the gear box or the fixed load of hook 8 be large enough so the secondary current never falls below the value necessary to maintain brake B released, then contactor LSC will be omitted completely and the connection to rectifier 86 omitted during hoisting. Friction brake B is then energized solely by means of current from the secondary circuit during hoisting.

Should the operator allow hook 8 to go through the overhoist limit switch to trip it and open contacts LS1 and LS2, friction brake B will set and stop further movement of the motor. This is because contactor LSC becomes de-energized to open contact LSC1 and thereby open the energization circuit for winding 10 of friction brake B. When friction brake B sets, it will stop rotor 2 from turning and prevent the cycling action heretofore described as being common to D.C. hoist schemes.

If the friction of the gear box or the fixed load on hook 8 is great enough so contactor LSC and energization from rectifier 86 eliminated as described, then the mere opening of contacts LS1 and LS2 would de-energize winding 10 and allow friction brake B to set. This is, because as described, the entire energization of friction brake B is from the secondary circuit and when contacts LS1 and LS2 open, the secondary circuit is de-energized.

Had the contact LS3 of the overhoist limit switch been connected in cross wire 59 as shown dotted, then the opening of contact LS3 would de-energize contactor H and it would return to its normal condition. Contacts H1 and H2 would disconnect stator 1 from the supply allowing the brake to set and stop the motor. This connection is called a shunt limit switch connection.

Regardless of the overhoist limit switch connection, it is necessary that drum controller 12 be moved to one of the lowering points so the load can move down and reset the overhoist limit switch.

It may be added that, if desired, the limit switch may be connected both as a series and a shunt limit switch where the shunt contact will be operated at the top and only in case of emergencies.

While these features have been described here in connection with the first point hoisting Ha, it will become obvious from the description for the other hoisting points that they also occur there.

On going to the second point hoisting Hb, the operating conditions described for the first point hoisting remain the same and additionally, contactor 1A operates to cut out rotor resistance sections R5, R12 and R19 as follows.

Contactor 1A is operated by current through contact 17, bar contact 28, cross wire 61, contact M5, winding 43, contact AUV3 and contact DUV2. Contactor 1A in operating closes its contacts 1A1 to 1A4. This cutting out of rotor resistance sections R5, R12 and R19 causes rotor 2 to speed up toward its higher speed.

The closing of contact 1A4 allows current to flow from wire 69 through cross wire 71, contact 1A4, contact M4 and winding 51 of timing contactor 2T to wire 75. As described, contact 2T1 will not close until after the elapse of a time delay after winding 51 is energized.

On going to the third point hoisting Hc, the operating conditions described for the second hoisting point remain the same and additionally, contactor 2A will be operated to cut out additional sections of resistance R4, R11 and R18. However, before this occurs the time delay determined by timing contactor 2T must have elapsed. This time delay ensures that the motor has had an opportunity to accelerate to the higher speed.

After the time interval, current will flow from contact 18 through bar contact 28, cross wire 62, contact 2T1, winding 44, contact AUV3 and contact DUV2. Contactor 2A operates to close its contacts 2A1 to 2A4 to cut out the resistance sections above described, allowing the motor to again increase its speed.

Additionally, contact 2A4 closes the circuit to winding 52 of timing contactor 3T so it is energized from wire 69 through cross wire 72, contact 2A4, winding 52 to wire 75. After its time interval has elapsed, timing contactor 3T will operate to close contact 3T1.

On going to the fourth point hoisting Hd, the operating conditions described for the third point hoisting remain the same and additionally, contactor 3A operates to short out sections of the rotor secondary resistance R3, R10 and R17. Again, contactor 3A cannot operate until timing contactor 3T has run its time interval. When the time period elapses, current will flow from contact 19 through bar contact 30, cross wire 63, contact 3T1, winding 45, contact AUV3 and contact DUV2. Contactor 3A operates to close contacts 3A1 to 3A4 and short out the above mentioned resistance sections in the secondary of rotor 2 so it is allowed to further increase its speed.

The closing of contact 3A4 energizes winding 53 of timing contactor 4T and current flows from wire 69 through cross wire 63, contact 3A4, winding 53 to wire 75. When timing contactor 4T operates, a time interval must elapse before its contact 4T1 closes.

Upon going to the fifth point hoisting He, the operating conditions described for the fourth hoisting point remain the same and additionally, contactors 4A and 5A automatically operate in two separate steps to short out rotor resistance sections R2, R9 and R16; and R1, R8 and R15, respectively. After the time interval for timing contactor 4T has elapsed, current flows from contact 20 through bar contact 31, cross wire 64, contact 4T1, winding 46, contact AUV3 and contact DUV2. Contactor 4A operates to close contacts 4A1 to 4A4. Contacts 4A1 to 4A3 close to short out resistance sections R2, R9 and R16.

Contact 4A4 closes the circuit so timing contactor 5T is energized from wire 69 through cross wire 74, contact 4A4 and winding 54 to wire 75.

After the interval between the energization of winding 54 for timing contactor 5T and the closing of contact 5T1 has elapsed, contactor 5A is operated by current from contact 20 through bar contact 31, cross wire 64, contact 5T1, winding 47, contact AUV3 and contact DUV2. Contacts 5A1 to 5A3 close to short out resistance sections R1, R8 and R15. The motor is now allowed to reach its maximum speed in the hoisting direction.

Throughout all of the hoisting positions, it is to be noted that the same safety features are available as were explained for the first hoisting point.

It is to be noted that while most of the resistance sections in the secondary circuit of rotor 2 have been shorted out, resistance sections R6, R13, R20 and resistance sections R7, R14 and R21 are still in the circuit. This is to ensure that the three phase rectifier will always have a voltage across its terminals.

Should it be desired to go from the "off" point to any one of the hoisting points, it can be done by moving the drum controller 12 to that point. The contactors will automatically operate in the manner described for each point until the desired point is reached. The time delay will still be provided between each point.

On going from the "off" position to the first point of lowering La, the secondary circuit of rotor 2 is connected to supply D.C. current to the stator 1. This is to provide the stator with a compensated braking torque due to the overhauling of the motor by the load in its movement downward. This is accomplished as follows:

Contactor DB is operated by current flowing from contact 21 through bar contact 38, cross wire 65, contact M6, contact L6, winding 48, contact AUV4 and contact DUV3. This closes contacts DB1 to DB5 and opens DB6.

Contactor 1CR is operated by current flowing from contact 17 through bar contact 34, cross wire 61, contact H5, contact 2CR2, winding 49, contact AUV4 and contact DUV3. This closes contacts 1CR1 to 1CR4.

After contactor DB operates, current also flows from contact 17 through bar contact 34, cross wire 61, contact DB5, winding 43 of contactor 1A, contact AUV3 and contact DUV2. Contactor 1A operates to close contacts 1A1 to 1A4 and short out resistance sections R5, R12 and R19.

After contactor 1CR operates, current flows from contact 18 through bar contact 35, cross wire 62, contact 1CR1, winding 44 of contactor 2A, contact AUV3 and contact DUV2. Contactor 2A operates to close contacts 2A1 to 2A4 and short out resistance sections R4, R11 and R18.

Again, after contactor 1CR operates, current flows from contact 19 through bar contact 36, cross wire 63, contact 1CR2, winding 45 of contactor 3A, contact AUV3 and contact DUV2. Contactor 3A operates to close contacts 3A1 to 3A4 and short out resistance sections R3, R10 and R17.

Also, after contactor 1CR operates, current flows from contact 20 through bar contact 37, cross wire 64, contact 1CR3, winding 46 of contactor 4A, contact AUV3 and contact DUV2. Contactor 4A operates to close contacts 4A1 to 4A4 and short out resistance sections R2, R9 and R16.

At the same time, current flows from contact 20 through bar contact 37, cross wire 64, contact 1CR4, winding 47 of contactor 5A, contact AUV3 and contact DUV2. Contactor 5A operates to close contacts 5A1 to 5A3 and short out resistance sections R1, R2 and R3.

After contactor DB operates, current flows from rectifier 86 through wire 87, wire 82, winding 10 of friction brake B, wire 83, contact DB2, wire 97, wire 101, stator 1, wire 102, wire 99, contact DB3, wire 100, contact DB1, wire 89, resistor R22 and wire 88 to rectifier 86. It is to be noted that the current path does not now contain resistors R23 and R24 as described for hoisting and thus, the current flowing is sufficient to release friction brake B.

Further, it is to be noted that the current energizing winding 10 also flows through stator 1 to impress braking torque on the rotor when friction brake B is released.

When friction brake B is released, the load will start to move downward and rotate the rotor in that direction with the only retarding force being that due to the D.C. energization of stator 1. As the rotor rotates, it produces a current in the secondary circuit and because most of the secondary resistance is shorted out, as described by the operation of contactors 1A, 2A, 3A, 4A and 5A, the current will be of a high value.

This current flows from the secondary circuit through the three phase rectifier, wire 82, winding 10, wire 83, contact DB2, wire 97, wire 101, stator 1, wire 102, wire 99, contact DB3, wire 100, wire 85 and wire 84 to the other side of the three phase rectifier and the secondary circuit. Stator 1 is now energized with a D.C. current proportional to that appearing in the secondary circuit, making the braking torque proportional to the speed at which the load is overhauling rotor 2. Thereby, the lowering speed is maintained constant and low for the first point lowering.

It is to be pointed out here that after contactors 1A, 2A, 3A and 4A operate, the windings of timing contactors 2T, 3T, 4T and 5T are energized in the same manner as before described. The lone exception is that for timing contactor 2T, contact DB4 is closed and current flows through it instead of contact M4. The operation of the timing contactors have no effect on the lowering operation at this point and after each has run its time interval, its contact closes.

On second point lowering Lb, the operating conditions described for the first lowering point remain the same except contact 20 disengages from bar contact 37 and contactors 4A and 5A are de-energized. This opens their contacts 4A1 to 4A4 and 5A1 to 5A3, respectively and resistance sections R2, R9, R16 and R1, R8, R15 are inserted back into the secondary circuit of rotor 2. This reduces the current going through the three phase rectifier and in the aforedescribed path to reduce the braking torque created in stator 1. The motor therefore is allowed to accelerate to a higher downward speed due to the overhauling load.

Timing contactor 5T becomes de-energized after contactor 4A is de-energized.

On third point lowering Lc, the operating conditions described for the second lowering point remain the same except contact 19 disengages from bar contact 36 and contactor 3A becomes de-energized to open its contacts 3A1 to 3A4 and resistance sections R3, R10 and R17 are inserted back into the secondary circuit of rotor 2. This further reduces the current that is used for supplying braking torque through stator 1 and allows the motor to accelerate to a faster lowering speed.

Timing contactor 4T becomes de-energized after contactor 3A becomes de-energized.

On the fourth point lowering Ld, the operating conditions described for the third lowering point remain the same except contact 18 disengages from bar contact 35 and contactor 2A is de-energized to open its contacts 2A1 to 2A4 and resistance sections R4, R11 and R18 are inserted back into the rotor secondary circuit. As before, this adds further resistance to the secondary circuit to reduce the current supplying braking torque to stator 1 and allows the motor to accelerate to a faster lowering speed.

Timing contactor 3T becomes de-energized after contactor 2A becomes de-energized.

Also, contact 22 engages with bar contact 39 and current flows therefrom through cross wire 66, winding 50 of contactor 2CR, contact AUV4 and contact DUV3. Contact 2CR operates to close contact 2CR1 and open contact 2CR2.

The opening of contact 2CR2 opens the energizing circuit for winding 49 and contactor 1CR becomes de-energized. Contacts 1CR1 to 1CR4 open.

The de-energization of contactor 1CR transfers the control of contactors 2A, 3A, 4A and 5A to their timing contactors 2T, 3T, 4T and 5T should drum controller 12 be moved back to a lower lowering point. This is because contactor 2CR remains energized when drum controller 12 is moved to the lower lowering points even though contact 22 disengages from bar contact 39 since current flows from contact 17 through bar contact 34, cross wire 61, contact H5, contact 2CR1, winding 50, contact AUV4 and contact AUV3. This is done to prevent a large sudden increase in the flow of the braking torque current through stator 1 and the resultant sudden increase in the braking torque.

On the fifth point lowering Le, the motor is reconnected to drive the load downward and the compensated D.C. braking circuit is disconnected. This is accomplished as follows.

Contact 14 engages with bar contact 32 and current flows through cross line 58, winding 40, contact AUV2 and contact DUV1 to operate contactor M.

Contact 16 engages with bar contact 33 and current flows through cross wire 60, contact H4, contact DB6, winding 42, contact AUV2 and contact DUV1 to operate contactor L.

When drum controller 12 was moved from the fourth to the fifth position, contact 21 disengages from bar contact 38 to de-energize winding 48 of contactor DB which becomes unoperated to open contacts DB1 to DB5 and close contact DB6.

Contact 17 remains engaged with bar contact 34, but contact DB5 opens to de-energize contactor 1A. As soon as contactor M is operated, contact M5 closes and contactor 1A is operated by current from contact 17, bar contact 34, cross wire 61, contact M5, winding 43, contact AUV3 and contact DUV2. This momentary opening of contactor 1A de-energizes timing contactor 2T so it must go through its time interval after contactor 1A is reenergized.

Contact 18 again engages with bar contact 35 and current flows through cross wire 62, contact 2T1, winding 44, contact AUV3 and contact DUV2. However, contactor 2A cannot be operated until after the time interval for timing contactor 2T had elapsed.

Contact 19 engages with bar contact 36 and current flows through cross wire 63, contact 3T1, winding 45, contact AUV3 and contact DUV2. Again, contactor 3A will not become energized until after the time interval for timing contactor 3T has elapsed.

Contact 20 becomes engaged with bar contact 37 and current flows through cross wire 64, through contact 4T1 after timing contactor 4T has run its time interval, winding 46, contact AUV3 and contact DUV2 to energize and operate contactor 4A. After the time interval for timing contactor 5T has elapsed, contact 5T1 closes and energizes winding 47 of contactor 5A through the aforedescribed path and contacts AUV3 and DUV2.

Therefore, in the fifth point lowering, all of the allowable resistance sections are shorted out of the secondary circuit in timed steps while the motor is connected to the supply mains 3, 4 and 5 by contactors M1, M2 and M3 and contacts L1 and L2. The motor accelerates to a fast speed driving the load downward.

Friction brake B has its winding 10 energized from the output of rectifier 86 through resistor R22, resistor R23, contact L4 and contact L3 so it remains released. Also, the secondary current from the motor flows through winding 10 of friction brake B to aid in maintaining it released.

Normally, the fifth point lowering Le is used only when lowering an empty hook. During the bottom portion of lowering, it is desired to move the hook slowly so it can be positioned. This is accomplished by moving drum controller to the fifth point for a short interval of time and then returning drum controller 12 to the "off" position. This effects movement of the hook downward for a small distance at a slow speed and then stops it. By repeating this movement of drum controller 12, an empty hook can be positioned very accurately.

The moving of drum controller 12 between the "off" position and the fifth lowering point is time consuming and also tiring to the operator. Therefore, I have mounted a push button in the handle of drum controller 12 so the operator can operate it with his thumb. The push button is connected in the circuit so when it is depressed and with drum controller 12 in its fourth lowering position, the control has the same effect as when drum controller 12 is in the "off" position. This is accomplished as follows.

As described, push button 25 is connected between supply main 3 and contact 21 on drum controller 12. Upon depressing push button 25, contact 21 disconnected from the supply. On the fourth point lowering, contact 21 is engaged with bar contact 38 to maintain contactor DB energized. Therefore, by depressing push button 25, contactor DB becomes de-energized and opens contacts DB1 to DB5 and closes contact DB6. The opening of contacts DB1, DB2 and DB3 opens the circuit energizing friction brake B and it sets to stop rotor 2.

Thus, I am able to obtain the same effect as would be obtained should drum controller 12 be moved to the "off" position without the necessity of moving drum controller 12 over the complete distance.

While I have described the push button as being located in the handle of drum controller 12, it is evident that it could be mounted separately according to the desires of the operator.

I claim:
1. A motor control system comprising; a stator having a circuit connectable to alternating current supply mains; a rotor having an external circuit containing resistance; a normally set friction brake connected to stop and hold the rotor; the brake having a winding for releasing it connected to be energized by current from the rotor circuit, said winding connected to be energized by a second current from a second source of a value sufficient to maintain the brake released once released by other means; control means for connecting the stator to the supply mains to produce a current in the rotor circuit whereby the brake holds the rotor from rotating until current from the rotor circuit is of a value sufficient to release the brake and the brake is maintained released by the second current.

2. A motor control system comprising; a stator having a circuit connectable to alternating current supply mains, first contacts connected in the stator circuit; contact operating means having normally open contacts connected to be energized through the first contacts from the supply mains to close its contacts; a rotor having an external circuit containing resistance; a normally set friction brake to stop and hold the rotor, the brake having a winding for releasing it and connected through the contact of said contact operating means to be energized from current flowing in the rotor circuit, said winding also connected to be energized through the contacts of said contact operating means by a second current from a second source, said second current being of a value sufficient only to maintain the brake released once released by other means; control means for connecting the stator to the supply mains through the first contacts to produce a current in the rotor circuit and the brake holds the rotor until the current from the rotor circuit is of a value to release the brake, said contact operating means is also energized by said control means to close its contacts, and the brake is released by current from the rotor circuit and maintained released by the second current from the second source and whereby the opening of said first contacts will de-energize said contact operating means to open its contacts causing the brake to set and stop the rotor.

3. In a hoist system, a hoist motor having a stator and a rotor; an alternating current circuit for energizing the stator from supply mains; an alternating current circuit for the rotor having external resistance connected therein; a normally set friction brake connected to the rotor and having a winding for releasing it; first rectifier means connecting the rotor circuit to energize the winding from current flowing in the rotor circuit; a second rectifier means connected to the supply mains to energize the winding with a value of current sufficient to hold the brake released when released by other means; operable contacts and circuits controlled thereby to energize the stator from the supply mains producing current flow in the rotor circuit and the brake holds the rotor until the current from the rotor circuit is sufficient to release the brake and allow the motor to start and whereby the brake is maintained released by current from the second rectifier means independent of the current from the rotor circuit.

4. In a hoisting system, a motor operable in a hoisting and lowering direction having a stator and a rotor; an alternating current circuit for energizing the stator from supply mains; an alternating current circuit for the rotor having external resistance connected therein; an overhoist limit switch having contacts connected in the stator circuit when operating in a hoisting direction; a normally set friction brake connected to the rotor and having a winding for releasing it; rectifier means connecting the rotor circuit to energize the winding from current flowing in the rotor circuit; operable contacts and circuits controlled thereby to energize the stator for hoisting through the limit switch contacts from the supply mains producing current flow in the rotor circuit to cause the brake to release and allowing the motor to hoist; and upon opening of the limit switch contacts the stator is disconnected from the supply mains so no current flows in the rotor circuit and the brake sets to stop the motor.

5. In a hoist system, a hoist motor operable in a hoisting direction having a stator and a rotor; an alternating current circuit for energizing the stator from supply mains; an overhoist limit switch having contacts in the stator circuit; an alternating current circuit for the rotor having external resistance therein; a normally set friction brake connected to the rotor and having a winding for releasing it; a first rectifier means connected to the rotor circuit to energize the winding from current flowing in the rotor circuit; a second rectifier means connected to the supply mains to energize the winding with a value of current sufficient only to maintain the brake released once released by other means; contact operating means connected to be energized through the limit switch contacts having normally open contacts connected in series with the winding; operable contacts and circuits controlled thereby to supply current through the limit switch contacts to the stator and the contact operating means to close its normally open contacts whereby current flow is produced in the rotor circuit and current therefrom releases the brake and allows the motor to hoist; and upon opening the contacts of the limit switch the stator is disconnected from the supply mains to de-energize the contact operating means, opening its contacts to de-energize the winding so the brake sets to stop the motor.

6. In a hoist system, a hoist motor operable in a hoisting and lowering direction having a stator and a rotor; an alternating current circuit for the stator connectable to supply mains; an alternating current circuit for the rotor having external resistance therein; a normally set friction brake connected to the rotor and having a winding for releasing it; a first rectifier means connected to the rotor circuit; a second rectifier means connected to the supply mains; operable contacts and circuits controlled thereby for operating the motor in the hoisting direction by connecting the stator to the supply mains and connecting the first rectifier means to the winding so current from the rotor circuit will energize the winding to release and maintain released the brake; and additional operable contacts and circuits controlled thereby for operating the motor in the lowering direction by connecting the second rectifier means to the winding and to the stator so current therefrom will release the brake and apply a braking torque on the rotor, and by connecting the first rectifier means to the winding and the stator so current from the rotor circuit will maintain the brake released and apply braking torque on the rotor.

7. A motor control system comprising; a stator having a circuit connected to a source of alternating current; a rotor having an external circuit containing impedance connected therein; a normally set friction brake connected to stop and hold the rotor, the brake having a winding for releasing it; a braking circuit connected to the stator circuit for current flow thereto and having the brake winding connected in said braking circuit to be energized by the current flowing therethrough; said braking circuit connectable to the rotor circuit for current flow therefrom through the braking circuit and brake winding to the stator circuit; and said braking circuit alternately connectable to the source of alternating current for current flow therefrom through the braking circuit and brake winding to the stator circuit, and in both instances the brake winding is energized by the flow to operate and release the brake and the current flowing to the stator circuit produces a dynamic braking current.

References Cited in the file of this patent
UNITED STATES PATENTS

| | | |
|---|---|---|
| 1,334,774 | McLain | Mar. 23, 1920 |
| 2,098,804 | Hootz | Nov. 9, 1937 |
| 2,525,541 | Grepe | Oct. 10, 1950 |
| 2,733,393 | Carlisle | Jan. 31, 1956 |
| 2,963,634 | Cortelli | Dec. 6, 1960 |
| 2,994,025 | Mitchell | July 25, 1961 |